United States Patent
Ben Moshe et al.

(10) Patent No.: US 11,226,963 B2
(45) Date of Patent: Jan. 18, 2022

(54) METHOD AND SYSTEM FOR EXECUTING QUERIES ON INDEXED VIEWS

(71) Applicant: Varada Ltd., Ramat Gan (IL)

(72) Inventors: Tal Ben Moshe, Kiryat Ono (IL); Kobi Luz, Rehovot (IL); David Krakov, Ramat Gan (IL); Roman Vainbrand, Kfar Saba (IL); Shlomi Alfasi, Hod Hashron (IL)

(73) Assignee: Varada Ltd., Ramat Gan (IL)

( * ) Notice: Subject to any disclaimer, the term of this patent is extended or adjusted under 35 U.S.C. 154(b) by 119 days.

(21) Appl. No.: 16/597,984

(22) Filed: Oct. 10, 2019

(65) Prior Publication Data

US 2020/0117676 A1    Apr. 16, 2020

Related U.S. Application Data

(60) Provisional application No. 62/744,179, filed on Oct. 11, 2018.

(51) Int. Cl.

| | |
|---|---|
| *G06F 16/24* | (2019.01) |
| *G06F 16/2455* | (2019.01) |
| *G06F 16/22* | (2019.01) |
| *G06F 13/40* | (2006.01) |
| *G06F 16/27* | (2019.01) |
| *G06F 16/25* | (2019.01) |

(52) U.S. Cl.
CPC ...... *G06F 16/2455* (2019.01); *G06F 13/4027* (2013.01); *G06F 16/2272* (2019.01); *G06F 16/254* (2019.01); *G06F 16/27* (2019.01)

(58) Field of Classification Search
CPC .. G06F 16/2455; G06F 16/27; G06F 16/2272; G06F 16/254; G06F 13/4027
USPC ................................................. 707/602–717
See application file for complete search history.

(56) References Cited

U.S. PATENT DOCUMENTS

| | | | |
|---|---|---|---|
| 6,073,134 A | 6/2000 | Shoup et al. | |
| 6,163,782 A * | 12/2000 | Singhal | ................... G06F 16/30 |

(Continued)

FOREIGN PATENT DOCUMENTS

JP    H07160557 A    6/1995

OTHER PUBLICATIONS

International Search Report and Written Opinion of International Searching Authority for PCT/US2019/055503, ISA/RU, Moscow, Russia, dated Feb. 18, 2020.

(Continued)

*Primary Examiner* — Hanh B Thai

(74) *Attorney, Agent, or Firm* — M&B IP Analysts, LLC

(57) ABSTRACT

A system and method for executing queries on an indexed view are presented. The method includes processing an input query directed to data maintained by the indexed view to generate a plurality of statements responsive to the input query, wherein the indexed view includes index information and a plurality data chunks; verifying a global index to locate segments of the indexed view; verifying a plurality of local indexes to locate data chunks containing values related to the plurality of statements, wherein the index information includes at least one local index per data chunk and at least one global index per the entire indexed view; processing the plurality of statements by accessing the data chunks containing values related to the plurality of statements; and responding to the input query based on the accessed data chunks.

25 Claims, 8 Drawing Sheets

(56) References Cited

U.S. PATENT DOCUMENTS

| | | | |
|---|---|---|---|
| 6,366,903 B1* | 4/2002 | Agrawal | G06F 16/24539 |
| 6,763,352 B2* | 7/2004 | Cochrane | G06F 16/24539 |
| 6,785,673 B1* | 8/2004 | Fernandez | G06F 40/143 |
| 6,795,830 B1* | 9/2004 | Banerjee | G06F 16/21 |
| 6,993,657 B1* | 1/2006 | Renner | G06F 21/6227 |
| | | | 713/182 |
| 7,257,597 B1* | 8/2007 | Pryce | G06F 16/214 |
| 7,499,907 B2* | 3/2009 | Brown | G06F 16/2272 |
| 7,676,450 B2* | 3/2010 | Ahmed | G06F 16/24537 |
| | | | 707/999.002 |
| 7,809,763 B2* | 10/2010 | Nori | G06F 16/213 |
| | | | 707/802 |
| 7,827,168 B2* | 11/2010 | Bernard | G06F 16/2272 |
| | | | 707/715 |
| 7,945,551 B1* | 5/2011 | Alpern | G06F 16/24539 |
| | | | 707/706 |
| 7,962,521 B2* | 6/2011 | Brown | G06F 16/2272 |
| | | | 707/791 |
| 8,200,612 B2* | 6/2012 | Soylemez | G06F 16/283 |
| | | | 707/600 |
| 8,266,101 B1* | 9/2012 | Shuai | G06F 16/275 |
| | | | 707/610 |
| 8,719,250 B2* | 5/2014 | Chong | G06F 16/25 |
| | | | 707/713 |
| 8,892,569 B2* | 11/2014 | Bowman | G06F 16/29 |
| | | | 707/743 |
| 9,195,936 B1* | 11/2015 | Chase | G06N 5/025 |
| 9,659,058 B2* | 5/2017 | Colwell | G06F 16/2455 |
| 10,037,355 B2* | 7/2018 | Velury | G06F 16/254 |
| 10,152,371 B1* | 12/2018 | Braunschvig | G06F 11/1056 |
| 10,324,782 B1* | 6/2019 | Dorfman | G06F 11/0727 |
| 10,528,599 B1* | 1/2020 | Pandis | H04L 67/1097 |
| 10,705,907 B1* | 7/2020 | Ben-Moshe | G06F 11/1068 |
| 10,713,247 B2* | 7/2020 | Petropoulos | G06F 16/24542 |
| 10,769,148 B1* | 9/2020 | Binkert | G06F 16/24542 |
| 10,810,202 B2* | 10/2020 | Ding | G06F 16/24524 |
| 11,074,261 B1* | 7/2021 | Pandis | G06F 16/258 |
| 11,119,998 B1* | 9/2021 | Certain | G06F 16/2272 |
| 2001/0044758 A1* | 11/2001 | Talib | G06F 16/9535 |
| | | | 705/26.1 |
| 2001/0047353 A1* | 11/2001 | Talib | G06F 16/954 |
| 2002/0095430 A1* | 7/2002 | Egilsson | G06F 16/2423 |
| 2003/0093407 A1* | 5/2003 | Cochrane | G06F 16/24539 |
| 2003/0093408 A1* | 5/2003 | Brown | G06F 16/2272 |
| 2003/0195862 A1* | 10/2003 | Harrell, Jr. | G06F 16/252 |
| 2003/0212664 A1* | 11/2003 | Breining | G06F 16/84 |
| 2004/0002954 A1* | 1/2004 | Chaudhuri | G06F 16/2462 |
| 2004/0205066 A1* | 10/2004 | Bhattacharjee | G06F 16/2343 |
| 2005/0187917 A1* | 8/2005 | Lawande | G06F 16/24549 |
| 2005/0203933 A1* | 9/2005 | Chaudhuri | G06F 16/86 |
| 2005/0210023 A1* | 9/2005 | Barrera | G06F 16/24537 |
| 2005/0216447 A1* | 9/2005 | Talib | G06F 16/319 |
| 2006/0085465 A1* | 4/2006 | Nori | G06F 16/213 |
| 2006/0085484 A1* | 4/2006 | Raizman | G06F 16/2282 |
| 2006/0235823 A1* | 10/2006 | Chong | G06F 16/2455 |
| 2006/0242563 A1* | 10/2006 | Liu | G06F 40/154 |
| | | | 715/234 |
| 2007/0162420 A1* | 7/2007 | Ou | G06F 16/27 |
| 2007/0214107 A1* | 9/2007 | Bello | G06F 16/24539 |
| 2007/0219952 A1* | 9/2007 | Ahmed | G06F 16/24537 |
| 2007/0226203 A1* | 9/2007 | Adya | G06F 16/2445 |
| 2007/0270658 A1* | 11/2007 | Mitchell | G09B 19/00 |
| | | | 600/300 |
| 2007/0288526 A1* | 12/2007 | Mankad | G06F 11/1662 |
| 2008/0222136 A1* | 9/2008 | Yates | G06F 16/2228 |
| 2008/0295092 A1* | 11/2008 | Tan | G06Q 30/04 |
| | | | 717/178 |
| 2008/0306883 A1* | 12/2008 | Baffier | G06F 11/1446 |
| | | | 705/400 |
| 2009/0064160 A1* | 3/2009 | Larson | G06F 16/2272 |
| | | | 718/104 |
| 2009/0182724 A1* | 7/2009 | Day | G06F 16/2453 |
| 2009/0307275 A1* | 12/2009 | Miyashita | G06F 12/1416 |
| 2010/0217759 A1* | 8/2010 | Ma | G06F 16/2282 |
| | | | 707/719 |
| 2010/0281005 A1* | 11/2010 | Carlin | G06F 16/22 |
| | | | 707/696 |
| 2010/0332526 A1* | 12/2010 | Nori | G06F 16/213 |
| | | | 707/769 |
| 2011/0173156 A1* | 7/2011 | Ou | G06Q 30/04 |
| | | | 707/634 |
| 2012/0303584 A1* | 11/2012 | Baffier | G06Q 30/0283 |
| | | | 707/640 |
| 2013/0124545 A1* | 5/2013 | Holmberg | G06F 16/50 |
| | | | 707/756 |
| 2013/0173955 A1* | 7/2013 | Hallak | G06F 12/0866 |
| | | | 714/6.24 |
| 2014/0172914 A1* | 6/2014 | Elnikety | G06F 16/9024 |
| | | | 707/774 |
| 2014/0244606 A1* | 8/2014 | Lou | G06F 16/2272 |
| | | | 707/696 |
| 2014/0279838 A1* | 9/2014 | Tsirogiannis | G06F 16/22 |
| | | | 707/603 |
| 2014/0280028 A1* | 9/2014 | Ding | G06F 16/2393 |
| | | | 707/717 |
| 2014/0317087 A1* | 10/2014 | Collins | G06F 16/2255 |
| | | | 707/715 |
| 2015/0278255 A1* | 10/2015 | Battaglia | G06F 16/21 |
| | | | 707/792 |
| 2015/0356314 A1* | 12/2015 | Kumar | G06F 16/2228 |
| | | | 713/165 |
| 2017/0024387 A1* | 1/2017 | Su | G06F 16/24556 |
| 2017/0116241 A1* | 4/2017 | Kumar | G06F 16/278 |
| 2017/0116264 A1* | 4/2017 | Baggett | G06F 16/2462 |
| 2017/0116275 A1* | 4/2017 | Baggett | G06F 16/2455 |
| 2017/0177700 A1* | 6/2017 | Bensberg | G06F 16/278 |
| 2017/0185326 A1* | 6/2017 | Meiri | G06F 3/067 |
| 2017/0206256 A1* | 7/2017 | Tsirogiannis | G06F 16/254 |
| 2018/0095952 A1 | 4/2018 | Rehal | |
| 2018/0096006 A1* | 4/2018 | Das | G06F 16/217 |
| 2018/0253425 A1 | 9/2018 | Raghavan et al. | |
| 2018/0285418 A1* | 10/2018 | Petropoulos | G06F 16/3332 |

OTHER PUBLICATIONS

Ivanova, et al., "Self-Organizing Strategies for a Column-store Database", EDBT 08: Proceedings of the 11th International Conference on Extending database technology: Advances in database technology, Chapter 3.1, Mar. 2008.

Bettilyon, "An Introduction to Hashing in the Era of Machine Learning," url: https://blog.bradfieldcs.com/an-introduction-to-hashing-in-the-era-of-machine-learning-6039394549b0, The Bradfield School of Computer Science, San Francisco, California, Apr. 2018.

* cited by examiner

METHOD AND SYSTEM FOR EXECUTING
QUERIES ON INDEXED VIEWS

CROSS-REFERENCE TO RELATED
APPLICATIONS

This application claims the benefit of U.S. Provisional Application No. 62/744,179 filed on Oct. 11, 2018, the contents of which are hereby incorporated by reference.

TECHNICAL FIELD

The present disclosure relates generally to the field of computer data storage.

BACKGROUND

A database is an organized collection of digital data, stored and accessed electronically. Database designers typically organize the data to model aspects of reality in a way that enables the retrieval of the information through computer processes. A database management system (DBMS) is a computer software that interacts with end users, applications, and the database itself to capture and analyze data. A DBMS allows the definition, creation, querying, updating, and administration of databases. Databases may be defined as row or column-based. In a row-based database, all of the information for a record in a table is stored together. This makes simple, record-centric activities (e.g., recording a transaction, viewing the details of an account, etc.) fast.

In a columnar database, the data in a table is partitioned so that each field is stored together. This makes analytical query activities (e.g., aggregating data across multiple fields of all of the records) much faster. This is because the queries can avoid reading the fields that are not needed for the query. The trade-off for the columnar approach is that record addition or update operations require multiple separate disk-access operations.

A data lake is a storage repository that holds a large amount of raw data in its native format until it is needed. While a hierarchical data warehouse stores data in files or folders, a data lake uses a flat architecture to store data. Each data element in the data lake is assigned a unique identifier and tagged with a set of extended metadata tags. When a business question arises, the data lake can be queried for relevant data, and that smaller set of data can then be analyzed to help answer the question.

Data lakes may reside in cloud environments where additional storage can be added on demand. Typically, data stored in the data lake is accessed by applications for deep learning, AI, analytics (e.g., business analytics), and the like to provide access to both historical and real-time data. Querying of the data lakes as required by such applications, is typically performed by elastic query engines (e.g., Presto®, Apache Drill®, Spark®, Impala®, etc.)

Data lakes provide means for decoupling data processing and data storage. That is, data stored on a data lake and is processed via a separate computing engine. Although data lakes provide flexibility in maintaining different types of data from different sources and are a cost-efficient storage solution, such storage architecture cannot be efficiently scaled up. Specifically, utilization of elastic query engines requires cloud computing resources, such as CPU, memory, and allocation of virtual machines. The ever-increasing demands of applications would be constrained by the allocated computing resources. To improve performance of executed applications, more computing resources can be allocated. However, this increases the overall cost for running such applications. Further, the scaling of computing resources would reduce efficiency, degrade performance, and increase maintenance.

Another disadvantage of executing data applications over data lakes is the transformation of data from existing sources to a data lake. This typically requires engineering the data from data sources into new models in order to make the data accessible in the data lake. This is typically performed with an extract, transform, load (ETL) tool. As data sources' formats, contents, and volumes are dynamically changing, as well as user and application demands, the transformation process would require months to complete.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for executing queries on an indexed view. The method includes processing an input query directed to data maintained by the indexed view to generate a plurality of statements responsive to the input query, wherein the indexed view includes index information and a plurality data chunks; verifying a global index to locate segments of the indexed view; verifying a plurality of local indexes to locate data chunks containing values related to the plurality of statements, wherein the index information includes at least one local index per data chunk and at least one global index per the entire indexed view; processing the plurality of statements by accessing the data chunks containing values related to the plurality of statements; and responding to the input query based on the accessed data chunks.

Certain embodiments disclosed herein also include a non-transitory computer readable medium having stored thereon causing a processing circuitry to execute a process for executing queries on an indexed view. The process includes processing an input query directed to data maintained by the indexed view to generate a plurality of statements responsive to the input query, wherein the indexed view includes index information and a plurality data chunks; verifying a global index to locate segments of the indexed view; verifying a plurality of local indexes to locate data chunks containing values related to the plurality of statements, wherein the index information includes at least one local index per data chunk and at least one global index per the entire indexed view; processing the plurality of statements by accessing the data chunks containing values related to the plurality of statements; and responding to the input query based on the accessed data chunks.

Certain embodiments disclosed herein also include a system for executing queries on an indexed view. The system comprising: a processing circuitry; and a memory, the memory containing instructions that, when executed by the processing circuitry, configure the system to: process an input query directed to data maintained by the indexed view to generate a plurality of statements responsive to the input query, wherein the indexed view includes index information and a plurality data chunks; verify a global index to locate segments of the indexed view; verify a plurality of local indexes to locate data chunks containing values related to the plurality of statements, wherein the index information includes at least one local index per data chunk and at least one global index per the entire indexed view; process the plurality of statements by accessing the data chunks containing values related to the plurality of statements; and respond to the input query based on the accessed data chunks.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
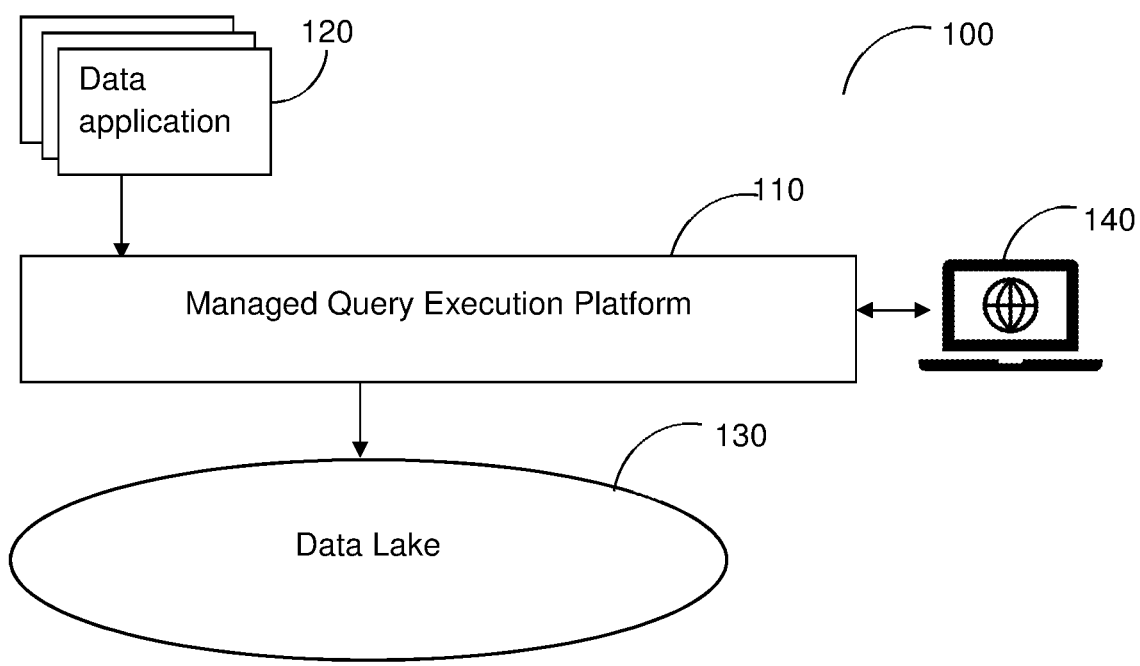
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to disclosed embodiments, a managed query execution platform is provided. The platform enables, among other tasks, execution of data analytics applications over data lakes. The platform further allows execution of such applications on the data stored in data lakes without the need to provide new models to transform the data in the data lakes through acceleration of, for example, standard query language (SQL) queries and commands. As such, the disclosed embodiments enable easy scaling of and support for more data applications (on a larger dataset) without allocating additional computing resources.

FIG. 1 is an example network diagram 100 utilized to describe the various disclosed embodiments. As illustrated in FIG. 1, a managed query execution platform 110 is deployed between a plurality of data applications 120 and at least one data lake 130. In an embodiment, the managed query execution platform 110 is configured to accelerate SQL commands and queries requested by the data applications 120, thereby improving their overall performance. A data application 120 may include any data analytics (e.g., business analytics) application, deep-learning application, artificial intelligence (AI) application, and any data-driven application.

The data lake 130 is a storage repository that holds a vast amount of raw data in its native format until it is needed. The data lake 130 is hosted in a cloud computing platform. For example, Azure® Data Lake is a scalable data storage and analytics service. The service is hosted in the Azure® cloud platform. As another example, Amazon® Simple Storage Service (S3) may host the storage. Another cloud-based data lake is Hadoop. It should be noted that the disclosed embodiments are not limited to data lakes and are also applicable to any types of means for object storage, such as Cassandra®. The disclosed embodiments may also be applicable to data streams, databases, data warehouse, and the like.

The managed query execution platform 110 includes a plurality of computing machines and storage devices (both shown in FIG. 2) that allow the acceleration of SQL queries and commands. As will be discussed in more detail below, by querying indexed views generated based on the data stored in the data lake 130, the views are indexed and stored in the storage devices of the query execution platform 110. Further acceleration is provided by implementation of an elastic query engine by each computing machine.

In an embodiment, a database manager (DBM) device 140 is also connected to the managed query execution platform 110. The DBM device 140 may be any client device allowing a user to configure the platform 110. Such a configuration may include creation of indexed views, creation of settings related to data indexing, creation of data synchronization settings, definition of connections to data lakes, and the like. The DBM device 140 may also generate reports related to the operation managed query execution platform 110, including, for example, an average time to execute a certain type of query, current load, number of active indexed views, and so on.

In one configuration, the managed query execution platform 110, the data applications, 120, and the data lake 130, may be communicatively connected over a network (not shown). Further, the managed query execution platform 110, the applications, 120, and the data lake 130 may be executed and/or deployed or integrated in the same cloud computing platform or different cloud computing platforms. The cloud computing platform may be a public cloud, a private cloud, or a hybrid cloud.

Figure 2:
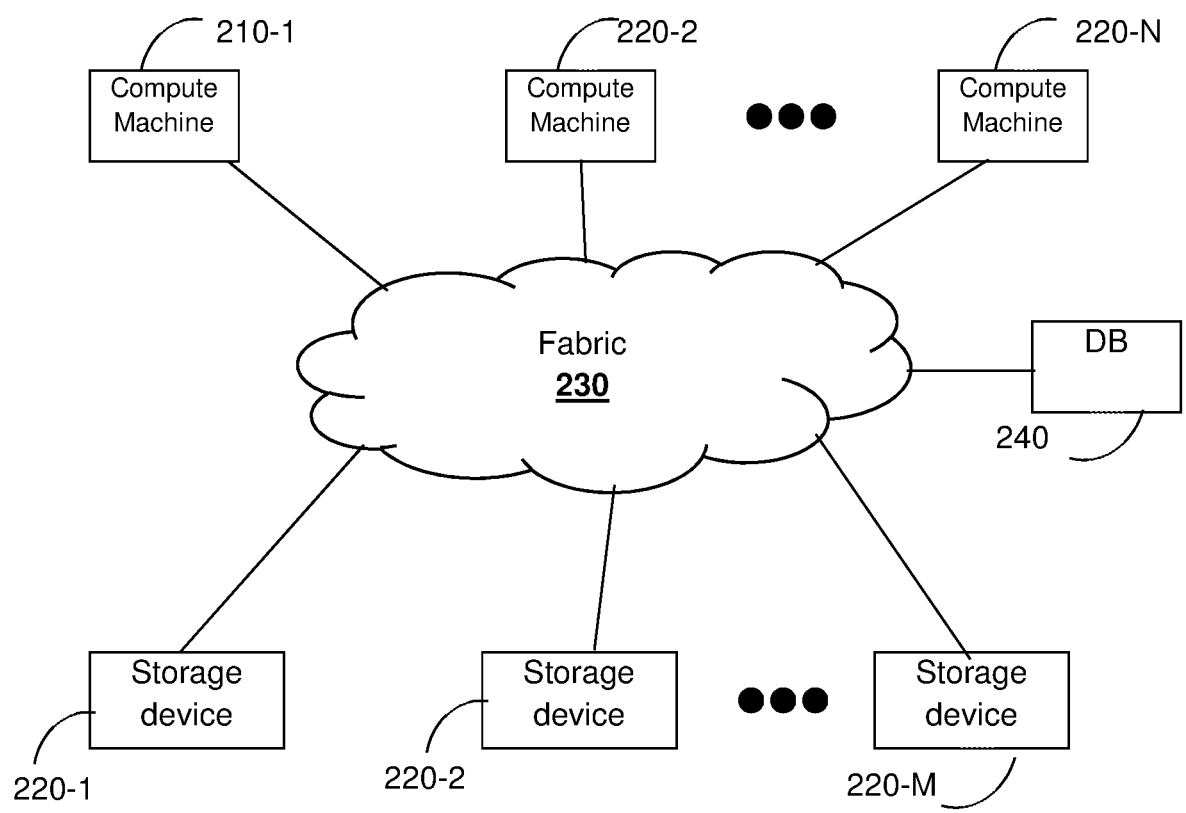
FIG. 2 is a diagram illustrating the architecture of the managed query execution platform.

FIG. 2 shows an example diagram illustrating the architecture of the managed query execution platform 110 according to an embodiment. The managed query execution platform 110 includes a plurality of computing machines 210-1 through 210-n connected to a plurality of storage devices 220-1 and 220-M over a fabric 230. Each machine 210 can communicate with each storage device 220 over the fabric 230. In some configurations, the managed query execution platform further includes a database 240. The database 240 is configured to keep query execution history and configuration parameters and settings; examples of such are discussed above.

Each computing machine 210 may be a physical machine (e.g., a server) or a virtual entity (e.g., a virtual machine, a software container, a micro-service, etc.) executed over a physical machine or hardware layer. According to disclosed embodiments, each computing machine 210 may be configured to execute queries received by a data application (120, FIG. 1) to allow fast processing of such queries. Each computing machine 210 requires a hardware layer for execution, an example of which is provided with reference to FIG. 7.

Each storage device 220 may include a solid-state persistent drive (SSD), such as Flash and non-volatile random-access memory (NVRAM). SSDs are a type of non-volatile computer memory storage devices which use integrated circuit assemblies as memory to store data. A storage device 220 may include any random-access media. Compared to electromechanical hard disk drives (HDD), SSDs have no moving mechanical components, such as spinning disks and movable read/write heads. This makes SSDs typically more resistant to physical shock, able run silently, and to have quicker access time and lower latency.

The fabric 230 may include an Ethernet fabric, an Infiniband fabric, and the like. In an embodiment, the fabric 230 may enable a storage communication protocol such as, but not limited to, remote direct memory access (RDMA) over Converged Ethernet (RoCE), an internet Wide Area RDMA Protocol (iWARP), Non-Volatile Memory Express (NVMe), NVMe over fabric (NVMeF), and the like.

It should be noted that the storage communication protocols, the computing machines, and the storage devices discussed herein are provided merely for exemplary purposes, and that other communication protocols may be equally utilized in accordance with the embodiments disclosed herein without departing from the scope of the disclosure.

The managed query execution platform 110 is configured as a shared-everything distributed architecture. That is, each computing machine 210 can access data stored in any storage device 220. In some configurations, a group of computing machines 210 and storage devices 220 may be clustered. Each cluster may serve a specific tenant and/or a set of indexed views.

In some embodiments, one of the computing machines 210 operates as an "orchestrator" while the other operate as "workers". An orchestrator is configured to plan and schedule execution of SQL queries or statements to the workers. The orchestrator may also be configured to allocate additional workers (computing machines) on demand. The functionality of a computing machine is determined, in part, by its query engine.

Figure 3:
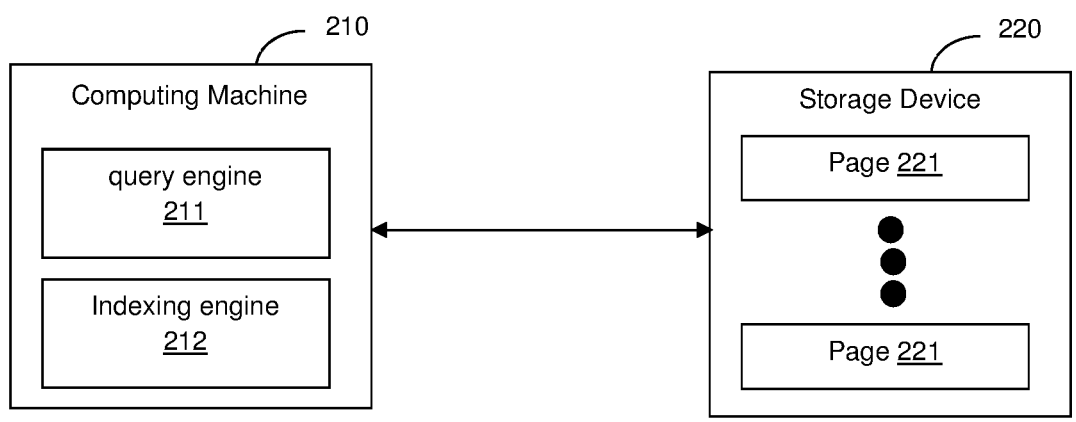
FIG. 3 is schematic diagram of a compute machine and a storage device utilized by the managed query execution platform according to an embodiment.

In an embodiment, illustrated in FIG. 3, a computing machine 210 implements a query engine 211 and an indexing engine 212. The query engine 211 allows execution of SQL queries over data lakes. Specifically, the query engine 211 is configured to parse SQL queries and plan their execution by pushing the parsed statements to the indexing engine 212. A query engine 211 may be realized using a third-party SQL engine, such as, but not limited to, Presto®, Apache Drill, Spark®, Impala, and the like. Typically, such a third-party SQL engine is configured with a plurality of connectors to allow access to data in various formants. Examples for such data formats include an optimized row columnar (ORC), Parquet, comma-separated values (CSV), JavaScript® object notation (JSON), and the like.

The storage devices 220 may be configured to store indexed views (and their contents). According to the disclosed embodiments, an indexed view is an SQL view or (dataset) segmented into a series of ordered vertical segments, each having a specified size or comprising a specified number of records. With respect to each column in a view (database), the intersection of the segments and the column creates data chunks. A data chunk includes a header and column data from the respective indexed view. A data chunk may further include index information. The data chunks and index information together constitute an indexed view, or a portion thereof. The contents of a data chunk and index information are discussed below.

As illustrated in FIG. 3, a storage device 220 maintains a plurality of memory pages 221. A memory page may include index information (at least a local index) and data chunk (not shown). A complete indexed view may be resided in memory pages 221 of one or more storage devices 220.

In another embodiment, when a query is executed, by a query engine 211, on an indexed view, the query may access data in one or more relevant columns by first serially verifying the data values in each column data chunk based, at least in part, on chunk metadata and chunk index. Thus, the query may be able to focus only on the relevant parts of the view and skip data chunks where the metadata indicates that the values searched for are not within the range stored in the segment. The query then may be configured to produce a bitmap of view rows which are responsive to the query. In some embodiments, based on the produced bitmap, a computing engine 210 may retrieve only those data chunks which contain data responsive to the query.

Typically, column-oriented databases store the values of a single column contiguously. This allows array-processing of the values of a column, wherein rows may further be constructed from column values if required. Query processing in columnar databases works on columns, so columnar representation can improve the performance of queries that only access a small subset of columns. Because every page reading a columnar database can access the values for many rows at once, a query may retrieve more values per I/O operation than with row-storage. The unique structure of columnar databases may provide for faster analytical query activities, known as Online Analytical Processing (OLAP). OLAP queries are typically used to derive new information from existing data (e.g., data aggregates, transformations, and/or calculations). Because OLAP queries typically only need to access a subset of columns in a table, a columnar representation of data allows for skipping irrelevant columns. Columnar databases may also provide for improved data compression ratios, because the encoding is done on multiple values that are of the same type and may have less entropy.

However, a potential downside of the columnar approach is that it is less well suited for transactional record activity, known as online transaction processing or OLTP. OLTP queries typically retrieve or modify individual records. OLTP queries executed on a columnar database will typically require an increased number of separate disk-access operations. OLTP queries are often triggered by end user requests, and therefore response time may be crucial.

Accordingly, a columnar database structure which allows for a reduction in disk access operations may be capable of providing the advantages of a columnar data representation while reducing the associated computational cost and time penalty as compared to traditional columnar database structures.

In some embodiments, the managed query execution platform 110 is configured for storing data in an SQL view. An SQL view is a virtual table based on the result-set of an SQL statement. A view contains rows and columns, just like a real table. The fields in a view are fields from one or more real tables in the database.

SQL statements (e.g., WHERE, JOIN) can be added to a view and present the data as if the data was retrieved from one single table. The indexed views support SQL statements including Filters, Joins, and aggregations.

For example, a Filter may be any SQL WHERE condition, on any column, within an p SQL statement that can use an index. Indices are used for point lookups, range queries and string matching of data saved in the storage devices 220. A join statement is any SQL JOIN command using the index of a key column. The index is most useful for dimensional JOINs: combining a fact table with a filtered dimension table. An aggregation command includes SQL aggregations and grouping can use the indexes for acceleration.

Figure 4A:
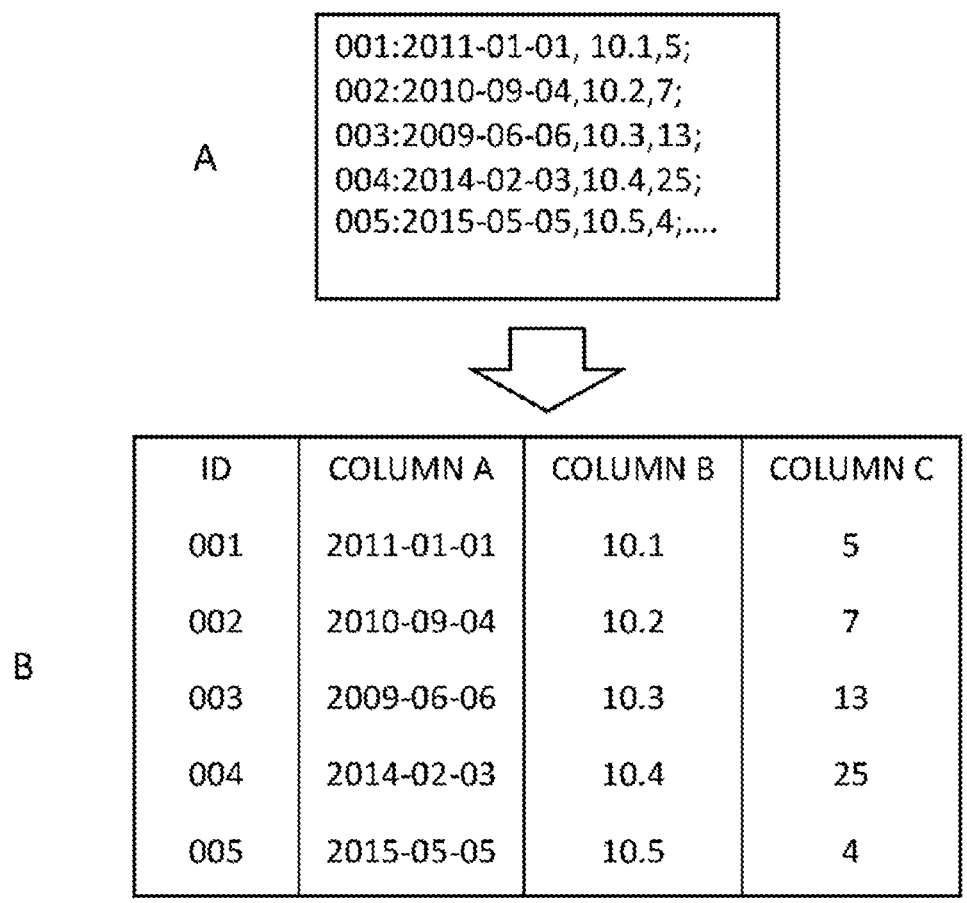
FIG. 4A is an illustration of a common view.
Figure 4B:
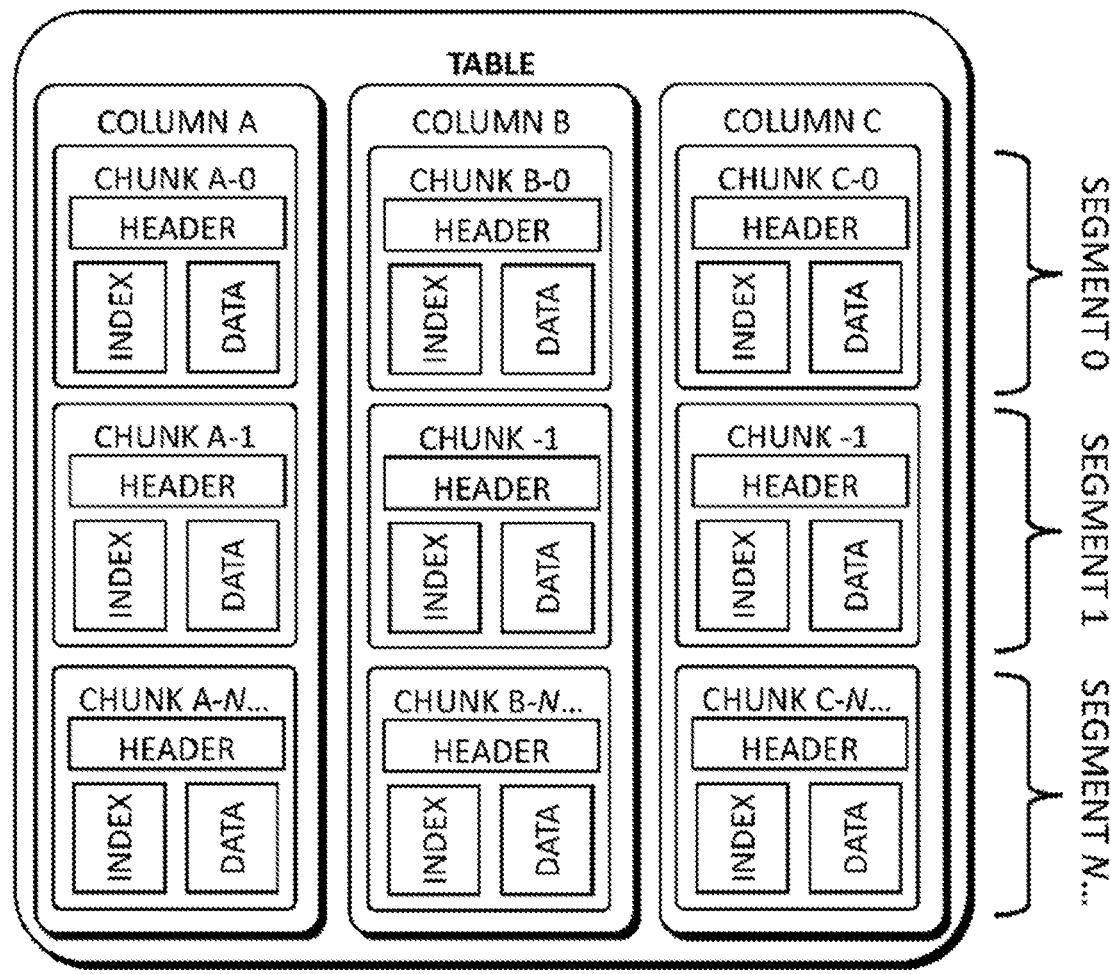
FIG. 4B is an illustration of an indexed view.

As noted above, each indexed view, created and utilized by the managed query execution platform, is segmented into a series of ordered vertical segments, each segment having a specified size or comprising a specified number of records. FIGS. 4A and 4B illustrate the segmentation of views according to an embodiment.

FIG. 4A is an illustration of a common (SQL) view 400 of a columnar database structure. The view 400 may be populated with data received in any format, e.g., comma-CSV, JSON, and the like. The data may be one or more database tables. The data utilized to populate the view 400 is saved in the data lake 130 and may be changed from time to time.

The managed query execution platform 110 is configured to create indexed views based on the stored in the data lake 130. The indexed views are saved in the storage devices 220 of the managed query execution platform 110, thereby allowing fast execution of queries and scalable solution. In an embodiment, views are predefined and can be created using an SQL "Create View" command.

FIG. 4B is a schematic illustration of an example indexed view 410 created according to an embodiment. The indexed view 410 is vertically segmented into a plurality of segments, e.g., segments 0, . . . , N. The intersection of each column A, . . . , N and each segment, creates a data chunk, e.g., chunks A-0, B-2, C-1, and so on. In some example configurations, each data chunk may have a size of 64 kilo-rows. In other example configurations, each data chunk may have a size that is larger or smaller than 64 kilo-rows, e.g., 128 kilo-rows, and so on.

In some embodiments, index information and a header are generated for each of the data chunks. The data chunk header may contain metadata such as a range of values, an average value (minimum-maximum), a mean value, a number of NOT NULL values, histograms, compression metadata, and so on.

In some embodiments, the index information may include any one of: a local index, a meta-index, and global index. The local index is information regarding the location of specific data within the data chunk. The meta-index is an entire column, comprising all indexes of each data chunk within the column of an indexed view. There are a plurality of local indexes indexing data chunks of a column. When scanning for a specific column the plurality of local indexes of data chunks are scanned in parallel. The global index is an index of the entire index view including all individual segments and local and meta indexes. It should be noted that additional and/or other index structures may be used.

In an embodiment, index information is generated by the indexing engine 212 in a computing machine 210 using an inline indexing process. Using this process, all the dimensions (columns) of an indexed view are automatically indexed. Data is indexed as it is loaded, at the rate of the data flow, without any user intervention or post-processing. The inline index process is adaptive to the data, where the index information, and particularly each local index is changed as the data in the view changes.

The data chunks of an indexed view are stored in one or more storage devices 220. The data chunks may be encoded and compressed prior to storage. In some embodiments, each data chunk may be stored on one or more memory pages of a storage device 220 having a native page size defined by, for example, the NVMe protocol. In some embodiments, larger page sizes may be used, such as 16 kilobytes or more. In some embodiments, each storage device's 220 memory page stores only data from a single data chunk.

A created indexed view (and its contents) is loaded to the storage devices 220 from the data lake based on the index information data layout. Once loaded, the managed query execution platform 110 is configured to automatically synchronize in real-time to the data in the indexed view with the data stored in the data lake. As the view is always indexed across all dimensions, consistently fast performance on any query on any dimension that can use an index, including filtering and joins are provided. The synchronization may be performed by any of the computing machines 210.

Specifically, data changes on the data lake are automatically tracked by each indexed view. When a data change is detected, the respective view can be automatically synchronized in near-real-time to the data lake. The synchronization of data may be of data addition and/or deletion.

In an embodiment, changes in the data lake are detected based on notifications received from the data lake and/or a user storing data therein; polling, i.e., periodically scanning of the data lake for changes; and/or monitoring changes in the database's catalog, such as table structure changes.

In an embodiment, the synchronization of an indexed view may be incremental and non-incremental. The former is defined when the SQL definition is incremental, any change of the data will be efficiently reflected in the view, while the latter occurs when the SQL definition is not incremental and is more like a data transformation workload (for example, includes a JOIN operation). In this case, any change of data may require a full view re-computation. In both embodiments, the data synchronization may be performed either on a predefined schedule, or via manual on-demand synchronizations.

Figure 5:
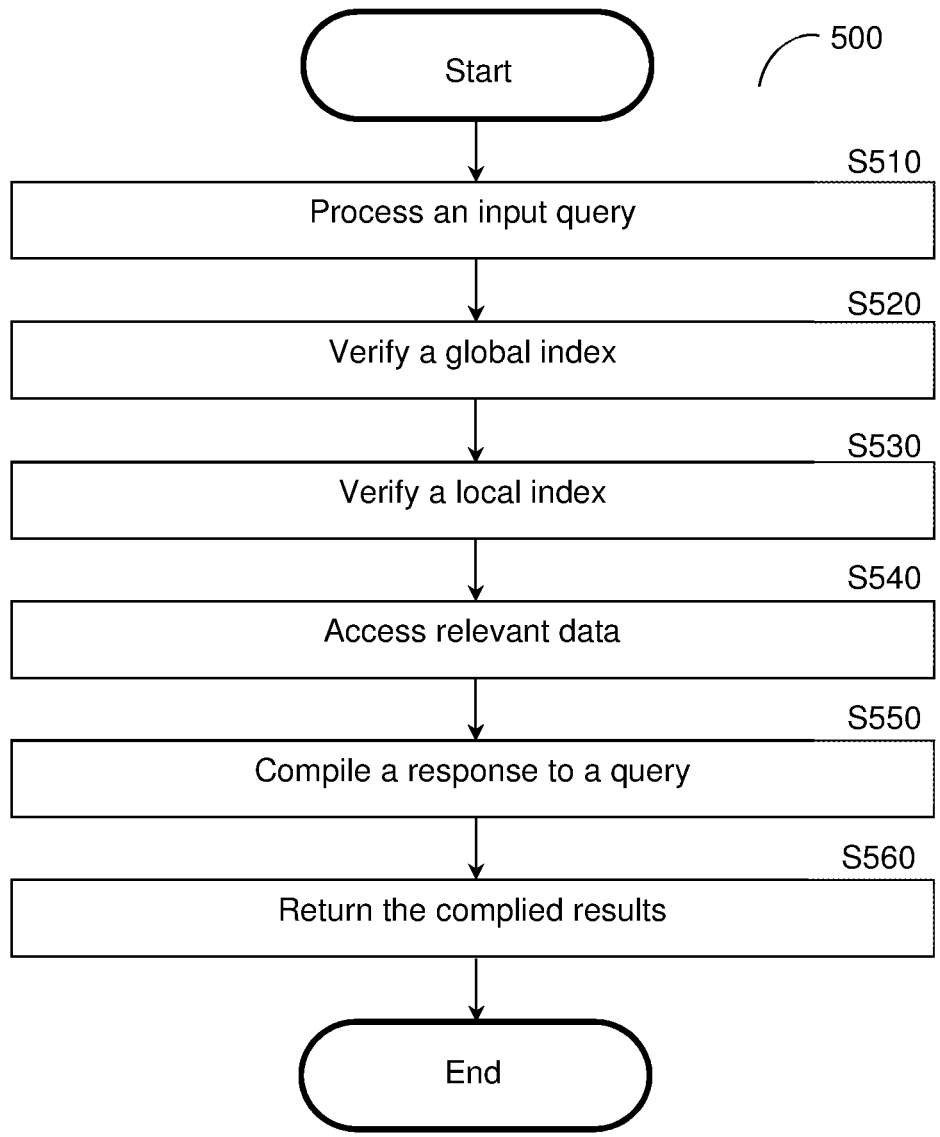
FIG. 5 is a flowchart illustrating a process for executing a query on an indexed view according to an embodiment.

FIG. 5 is an example flowchart 500 illustrating a process for executing a query on an indexed view according to an embodiment. The process may be performed by the managed query execution platform and, in particular, by one or more computing machines in the platform.

At S510, a query is received from a data application and processed. In an embodiment, the processing of a query includes parsing, planning, and scheduling a distributed query plan across the compute machines. The parsing may include breaking the query into statements (also known as "push downs") to allow different statements execute on different machines. That is, the processing of a query can be performed in parallel. All processing is performed in-memory of a computing machine.

For example, the following query may be processed:
SELECT
   COLUMNS A, C FROM INDEXED VIEW_1
   WHERE COLUMN B=3 OR B=8

The query calls for retrieving specific rows from columns A and C, where column B has a value of 3 or 8. In this example, 2 independent statements can be parsed to be processed in parallel: one looking for values in column B equal to 3; and the other looking for values in column B equal to 8.

At S520, a global index of the queried indexed view is verified. This is performed in order to locate segments and data chunks in such segments of the queried indexed view. For example, the segments of the INDEXED VIEW_1 are verified. S520 may also include verifying the mate-index to locate the queried columns in the indexed view.

At S530, the plurality of local indexes are verified to locate the data chunks containing values related to one or more statements in the processed queries. The plurality of local indexes are verified or scanned in parallel. This may be performed in a distributed manner by a number of computing machines. Alternatively or collectively, data chunks' headers are verified to determine chunk value ranges, based on header metadata. In the above example query, local indices of data chunks containing the column B data are verified.

At S540, indexes of the relevant data chunks are accessed in order to retrieve the data responsive to the statements (and hence the query). The data chunks are accessed in parallel from a number of storage devices, responsive to a number of statements executed in parallel. In an embodiment, relevant rows in each data chunk which contain data responsive to the query are accessed. It should be noted that this step can be performed for every statement in the processed query.

At S550, the retrieved data is calculated or complied responsive to the query. The data from data chunks are retrieved, in parallel from a number of storage devices, responsive to a number of statements executed in parallel. In some embodiments, the data chunks are decoded or decompressed.

At S560, the compiled query results are returned. For example, the results are returned to the data application issued the query.

Figure 6:
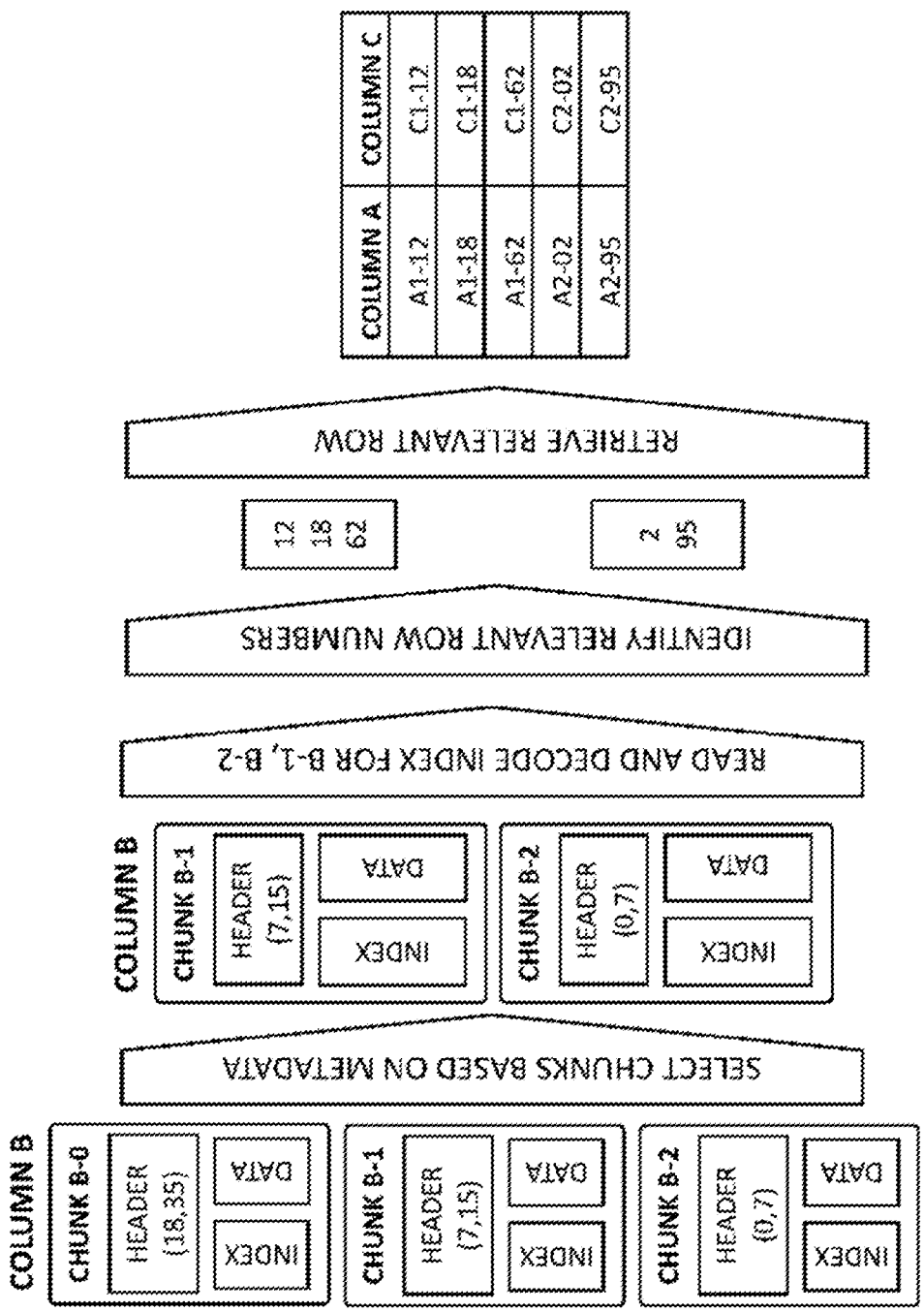
FIG. 6 is a diagram illustrating the execution of an example query according to an embodiment.

FIG. 6 is a diagram illustrating the execution of the above example query, according to an embodiment. As can be seen, column 600-B includes, e.g., 3 chunks (B-0, B-1, B-2), where only chunks B-1 (value range 7-15) and B-2 (value range 0-7) contain values responsive to the WHERE condition in the query. Thus, the segment B-0 is not accessed.

The local indices of data chunks B-1 and B-2 are accessed to identify the relevant rows in each data chunk which contain data responsive to the query. The relevant data chunks may be detected. In this example, specified rows have been identified within data chunks B-1 (e.g., rows 12, 18, 62) and B-2 (e.g., rows 2, 95) as containing the values responsive to the WHERE clause of the query. Data chunks A-1, A-2, C-1, and C-2 associated with column A and C may be decoded.

The following relevant rows are retrieved from each relevant data chunk in columns A and C:

| COLUMN A | COLUMN C |
| --- | --- |
| AI -12 | C I-12 |
| AI -18 | C I-18 |
| AI -62 | C I-62 |
| A2-02 | C2-02 |
| A2-95 | C2-95 |

The disclosed embodiments provide technical improvements over existing solutions.

For example, when tested during a demonstration of query retrieval results against Presto®, the data used in the demonstration included rideshare information collected from a database comprising 5 billion records, representing 25 million rideshare trips recorded over 3 months, with a user base of 5 million users and 200,000 drivers.

The time for processing a query has been reduced from minutes to seconds. For example, the time for processing a query for "rides of specified user" is 0.6 s, using the disclosed embodiments, in comparison to 1 minute and 36 seconds using the existing Presto® solution. As another example, the time for processing a query for "rides within specified area, age group, and time of the day" is 3.1 seconds, using the disclosed embodiments, in comparison to 1 minute using the existing Presto® solution.

Figure 7:
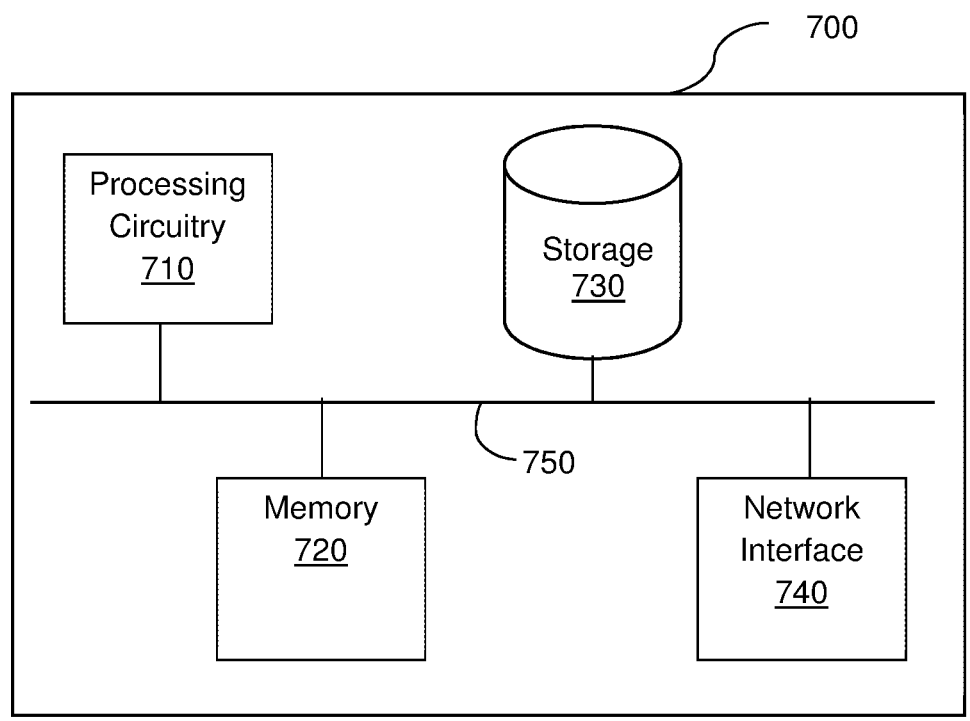
FIG. 7 is a schematic block diagram of a hardware layer implemented by each computing machine according to an embodiment.

FIG. 7 is an example schematic block diagram of a hardware layer 700 implemented by each computing machine according to an embodiment. The hardware layer 700 includes a processing circuitry 710 coupled to a memory 720, a storage 730, and a network interface 740. In an embodiment, the components of the hardware layer 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, or any other medium which can be used to store the desired information.

The network interface 740 allows the hardware layer 700 communicate with servers running the data applications and infrastructures hosting data lakes. The network interface 740 may also include means for communicating with storage devices using storage communication protocols.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for executing queries on an indexed view, comprising:
   processing an input query directed to data maintained by the indexed view to generate a plurality of statements responsive to the input query, wherein the indexed view includes index information and a plurality of data chunks;
   verifying a global index to locate segments of the indexed view;
   verifying a plurality of local indexes to locate data chunks containing values related to the plurality of statements, wherein the index information includes at least one local index per data chunk and at least one global index per the entire indexed view;
   processing the plurality of statements by accessing the data chunks containing values related to the plurality of statements; and
   responding to the input query based on the accessed data chunks.

2. The method of claim 1, further comprising:
   verifying the plurality of local indexes in parallel.

3. The method of claim 1, further comprising:
   scheduling execution of the plurality of statements; and
   executing the plurality of statements in parallel by distributed computing machines.

4. The method of claim 1, wherein the indexed view is segmented into a series of ordered vertical segments, wherein the data chunks are based on intersection of the vertical segments and each column in the indexed view.

5. The method of claim 4, wherein the local indexes provide for indexing a plurality of data chunks of a respective column, wherein the plurality of data indexes are independent of each other.

6. The method of claim 5, wherein the index information further includes: at least one meta-index per column.

7. The method of claim 1, wherein the indexed view is managed by a managed query execution platform, wherein the managed query execution platform includes: a plurality of computing machines; a plurality of storage devices; and a communication fabric allowing the communication of the plurality of computing machines to the plurality of storage devices over a storage communication protocol, wherein the plurality of storage devices are configured to maintain the indexed view.

8. The method of claim 7, wherein the indexed view is a presentation of customer data stored in at least one data lake accessed through the managed query execution platform.

9. The method of claim 8, further comprising:
   synchronizing data between the indexed view and data stored in the at least one data lake.

10. The method of claim 9, wherein the synchronization is performed in real-time or at near real-time.

11. The method of claim 9, wherein synchronizing data between the indexed view and data stored in the at least one data lake further comprises:
   detecting changes in the data stored in the at least one data lake.

12. The managed query execution platform of claim 1, wherein the input query is any one of: an SQL query and an SQL command.

13. A non-transitory computer readable medium having stored thereon instructions for causing a processing circuitry to execute a process, the process comprising:
   processing an input query directed to data maintained by the indexed view to generate a plurality of statements responsive to the input query, wherein the indexed views includes index information and a plurality of data chunks;
   verifying a global index to locate segments of the indexed view;
   verifying a plurality of local indexes to locate data chunks containing values related to the plurality of statements, wherein the index information includes at least one local index per data chunk and at least one global index per the entire indexed view;
   processing the plurality of statements by accessing the data chunks containing values related to the plurality of statements; and
   responding to the input query based on the accessed data chunks.

14. A system for executing queries on an indexed view, comprising:
   a processing circuitry; and a memory, the memory containing instructions that, when executed by the processing circuitry, configure the system to:

process an input query directed to data maintained by the indexed view to generate a plurality of statements responsive to the input query, wherein the indexed view includes index information and a plurality of data chunks;

verify a global index to locate segments of the indexed view;

verify a plurality of local indexes to locate data chunks containing values related to the plurality of statements, wherein the index information includes at least one local index per data chunk and at least one global index per the entire indexed view;

process the plurality of statements by accessing the data chunks containing values related to the plurality of statements; and respond to the input query based on the accessed data chunks.

15. The system of claim 14, wherein the system is further configured to:
verify the plurality of local indexes in parallel.

16. The system of claim 14, wherein the system is further configured to:
schedule execution of the plurality of statements; and
execute the plurality of statements in parallel by distributed computing machines.

17. The system of claim 14, wherein the indexed view is segmented into a series of ordered vertical segments, wherein the data chunks are based on intersection of the vertical segments and each column in the indexed view.

18. The system of claim 17, wherein the local indexes provide for indexing a plurality of data chunks of a respective column, wherein the plurality of data indexes are independent of each other.

19. The system of claim 18, wherein the index information further includes: at least one meta-index per column.

20. The system of claim 14, wherein the indexed view is managed by a managed query execution platform, wherein the managed query execution platform includes: a plurality of computing machines; a plurality of storage devices; and a communication fabric allowing the communication of the plurality of computing machines to the plurality of storage devices over a storage communication protocol, wherein the plurality of storage devices are configured to maintain the indexed view, wherein the system is any computing machines out of the computing machines.

21. The system of claim 20, wherein the indexed view is a presentation of customer data stored in at least one data lake accessed through the managed query execution platform.

22. The system of claim 21, wherein the system is further configured to:
synchronize data between the indexed view and data stored in the at least one data lake.

23. The system of claim 22, wherein the synchronization is performed in real-time or at near real-time.

24. The system of claim 22, wherein the system is further configured to:
detect changes in the data stored in the at least one data lake.

25. The system of claim 14, wherein the inputs query is any one of: an SQL query and an SQL command.

* * * * *